3,369,011
PROCESS FOR PRODUCING AMORPHOUS CO-
POLYMERIZATES OF ETHYLENE AND HIGHER
ALPHA-OLEFIN
Alberto Valvassori, Milan, Renato Serra, Ferrara, and
Guido Sartoni, Milan, Italy, assignors to Montecatini
Edison S.p.A., Milan, Italy
No Drawing. Continuation of application Ser. No.
260,835, Feb. 25, 1963. This application Oct. 19,
1966, Ser. No. 587,936
Claims priority, application Italy, Feb. 27, 1962,
3,979/62
10 Claims. (Cl. 260—88.2)

This application is a continuation of application Ser. No. 260,835, filed Feb. 25, 1963, and now abandoned.

This invention relates to a process for the preparation of linear, amorphous, high molecular weight copolymers of ethylene and one or more higher alpha-olefins. More particularly, this invention relates to a process for the preparation of such ethylene-propylene or ethylene-butene-1 copolymers.

In summary, this invention provides a process for copolymerizing ethylene and a higher alpha-olefin in contact with a catalyst the essential starting components of which are a dialkyl aluminum halide and a coordination compound of a Lewis base with a halogenated vanadium compound.

Until recent times, the known copolymerizates of ethylene with a higher alpha-olefin, such as propylene, were film-forming plastic materials made up of macromolecules each exhibiting a partial crystallinity at the X-rays.

Elastomeric high molecular weight copolymerizates of ethylene and, e.g., propylene which are amorphous when examined under the X-rays, and free or substantially free of homopolymers of the respective monomers, have been disclosed only recently, and as is known, have been obtained only by the use of a comparatively few selected and particular catalyst systems.

The present invention provides an improved process according to which there is obtained a marked increase in the copolymerization rate and in the yield of copolymer based on the amount of catalyst used.

According to the present invention ethylene and one or more higher alpha-olefins are copolymerized in the presence of a catalyst prepared by mixing a dialkyl aluminum halide with a coordination compound of a Lewis base with a halogenated vanadium compound, the catalyst preparation and the copolymerization being carried out at a temperature of from 0° C. to —180° C, preferably from —10° C. to —50° C.

The preferred dialkyl aluminum halides $R_1R_2AlX$, used in preparing the catalyst are those in which each of the alkyl radicals $R_1$ and $R_2$ preferably contains from 1 to 6 carbon atoms, and in which X is any halogen, specifically chlorine or fluorine.

Typical halogenated vanadium compounds which form coordination compounds with a Lewis base that are useful as one catalyst-forming component include vanadium tetrachloride, vanadium trichloride, and vanadyl trichloride.

Lewis bases which form coordination compounds with the halogenated vanadium compound include e.g.

(a) aliphatic ethers, such as diethyl ether, dipropyl ether and diisobutyl ether; diethoxy ethane, etc.;
(b) cyclic ethers, such as tetrahydrofurane, dioxane, etc.,
(c) tertiary amines, such as trimethyl amine, diethyl methylamine, etc.,
(d) heterocyclic nitrogen bases, such as pyridine, quinoline, etc.

The catalyst may be preformed by dissolving the dialkyl aluminum halide in a solvent, and mixing the resulting solution with a solution of the vanadium compound-Lewis base coordination compound, the mixture being then brought into contact with the monomers to be copolymerized.

In a presently preferred embodiment, however, the catalyst is prepared in the presence of the monomers to be copolymerized.

The activity of the catalysts prepared and used at the temperature in the range 0° C. to —80° C. is much higher than the activity of the same catalysts prepared at higher temperatures and, moreover, the activity of the catalysts prepared and used at 0° C. to —80° C. remains practically constant.

The activity of the present catalysts varies with the molar ratio of the catalyst-forming components. Advantageously, the molar ratio of dialkyl aluminum halide to vanadium compound-Lewis base coordination compound is from 2:1 to 30:1, preferably from 4:1 to 20:1.

The copolymerization of ethylene and the higher alpha-olefin can be carried out in the absence of a solvent, or in an inert hydrocarbon solvent which can be an aliphatic hydrocarbon such as, for example, n-heptane or isooctane; an aromatic solvent of which benzene and toluene are exemplary; or a halogenated hydrocarbon such as chloroform, trichloroethylene, tetrachloroethylene, chlorobenzene, etc. or mixtures thereof.

Ethylene and the other alpha-olefin can be copolymerized with the present catalyst in a continuous process, by feeding additional catalyst to the system as required, either periodically or continuously, during the copolymerization; by maintaining constant the ratio between the monomers concentration in the liquid phase by feeding continuously into the system a mixture of the monomers having a constant composition.

If the continuous copolymerization is carried out in the absence of the extraneous inert solvent, a monomers mixture comprising a minor amount of ethylene and a major amount of propylene (or other higher alpha-olefin) may be fed continuously into the system while maintaining constant temperature and pressure conditions.

The ethylene/higher alpha-olefin copolymerizates, more particularly the ethylene/propylene and ethylene/butene-1 copolymerizates obtained by the present process and which contain ethylene in an amount below 75% by moles (e.g., between 5% and 75% by moles) are completely amorphous when examined under the X-rays.

Such copolymerizates are obtained by maintaining a fixed molar ratio of the monomers in the mixture to be copolymerized, throughout the copolymerization.

Ethylene and propylene can be copolymerized to an amorphous copolymerizate by maintaining a propylene to ethylene molar ratio of 4:1 or higher in the liquid phase throughout the copolymerization, molar ratios of 200:1 to 4:1 being satisfactory.

Ethylene and butene-1 can be copolymerized to an amorphous copolymerizate by maintaining a butene-1 to ethylene molar ratio of 20:1 or higher in the reacting liquid phase, molar ratios of 1000:1 to 20:1 being satisfactory.

Taking the foregoing into account, it is possible to obtain copolymerizates of widely varying composition by varying the mol ratio of the monomers present in the liquid phase.

The copolymerizates are solid at normal temperature and usually have a molecular weight in excess of 20,000, as determined from the intrinsic viscosity.

The amorphous copolymers obtained by the present process are useful in the synthetic rubbers arts; they are vulcanizable and when vulcanized yield elastomers having good mechanical properties.

The following examples are given to further illustrate the invention and are not intended as restrictive:

*Example 1*

The reaction apparatus consists of a large glass tube of 750 cc. capacity, a 5.5 cm. diameter, provided with tubing for gas inlet and outlet, a mechanical stirrer and a thermometer casing. The gas inlet tube extends down to the bottom of the container and ends in a porous disk having a diameter of 3.5 cm. The apparatus is thermostatically set at a temperature of −20° C. 350 cc. of anhydrous n-heptane are introduced, and this solvent is then saturated at a temperature of −20° C. by feeding in a mixture containing propylene and ethylene in 4:1 molar ratio, at a rate of 250 Nl./h.

Meanwhile the catalyst is prepared at a temperature of −20° C. by mixing 14 millimols of diethyl aluminum monochloride in 20 cc. anhydrous toluene with 2.8 millimols of vanadium trichloride tetrahydrofuranate in 20 cc. anhydrous toluene.

The catalyst thus prepared is introduced into the reaction apparatus one minute after it is prepared. The feeding of the propylene/ethylene mixture is continued at a rate of 400 Nl./h. Ten minutes after the catalyst is introduced, 20 cc. of methanol are added to stop the reaction.

The resulting product is freed of inorganic impurities by subjecting it, repeatedly, to treatment with aqueous hydrochloric acid, and separating the two phases which are formed.

The heptane phase is then washed with water until it becomes neutral, and the copolymer is coagulated by treating it with an excess of an acetone-methanol mixture, and dried in vacuo.

The vacuum-dried product amounts to 15 g. of a white and rubberlike solid which is completely amorphous at the X-rays.

It contains about 40% mols of ethylene, as determined by a radiochemical test, and has an intrinsic viscosity, determined in tetralin at 135° C., equal to 2.4.

The average copolymerization rate is of $$296 \frac{\text{g. copolymer} \times \text{liter}}{\text{g. vanadium} \times \text{h.} \times \text{mole } (C_2H_4 + C_3H_6)}$$

Operating under the same conditions, but preparing the catalyst and carrying out the copolymerization at 25° C., instead of at −20° C., there are obtained only 2.2 g. of an ethylene-propylene copolymer in 20 minutes, from which an average rate is determined of $$75.5 \frac{\text{g. copolymer} \times \text{liter}}{\text{g. vanadium} \times \text{h.} \times \text{mole } (C_2H_4 + C_3H_6)}$$

*Example 2*

Example 1 is repeated, except that VCl$_3$ pyridinate is used for the preparation of the catalyst, in place of VCl$_3$ tetrahydrofuranate.

Into the reaction apparatus as described in Example 1, previously deaerated and thermostatically seat at −20° C., 350 cc. n-heptane are introduced under nitrogen, and this solvent is then saturated by feeding in a gaseous mixture of propylene-ethylene in 4:1 molar ratio, at a rate of 200 Nl./h.

Meanwhile, the catalyst is prepared at a temperature of −20° C. by mixing 1.4 millimols of tripyridinate of vanadium trichloride (VCl$_3$.[C$_5$H$_5$N]$_3$) in 25 cc. of anhydrous toluene with 7 millimols of diethyl aluminum monochloride in 25 cc. of anhydrous toluene.

One minute after it is prepared, the catalyst is siphoned under nitrogen into the reaction apparatus.

The feeding of the propylene/ethylene mixture is continued for 10 minutes, at a rate of 400 Nl./h., while stirring.

30 cc. methanol are introduced to stop the reaction, and the copolymer obtained is purified by treating it repeatedly with aqueous hydrochloric acid. It is coagulated eventually with acetone and methanol. 4 g. of an ethylenepropylene copolymer are obtained which contains about 48% mols of ethylene. The copolymer is completely amorphous at the X-rays. The average copolymerization rate is of $$159 \frac{\text{g. copolymer} \times \text{liter}}{\text{g. vanadium} \times \text{h.} \times \text{mole } (C_2H_4 + C_3H_6)}$$

Operating under the same conditions, but carrying out both the catalyst preparation and the copolymerization at a temperature of 25° C., instead of at −20° C., there are obtained only 0.3 g. of ethylene-propylene coplymer in 25 minutes, which corresponds to an average copolymerization rate of $$16.6 \frac{\text{g. copolymer} \times \text{liter}}{\text{g. vanadium} \times \text{h.} \times \text{mole } (C_2H_4 + C_3H_6)}$$

*Example 3*

Into the reaction apparatus as described in Example 1, which is thermostatically set at −20° C., there are introduced 350 cc. of anhydrous n-heptane, which is then saturated, at a temperature of −20° C. by feeding in, a propylene-ethylene mixture at a rate of 250 Nl./h.

The catalyst is prepared under nitrogen at a temperature of −20° C., by mixing 14 millimols of diethyl aluminum monochloride in 20 cc. of anhydrous toluene with 2.8 millimols of the complex formed by vanadium trichloride with symmetrical diethoxyethane in 20 cc. of anhydrous toluene.

The catalyst thus prepared is introduced into the apparatus one minute after it is prepared. The feeding of the ethylene/propylene mixture is continued at a rate of 400 Nl./h. 20 minutes after the introduction of the catalyst, the reaction is stopped by adding 20 cc. methanol. The product is purified and separated as described in Example 1. After vacuum drying, 20 g. of a white and rubber-like solid, amorphous at the X-rays, are obtained.

It contains 45% mols of ethylene, as determined by radiochemical test.

The average copolymerization rate is of $$172 \frac{\text{g. copolymer} \times \text{liter}}{\text{g. vanadium} \times \text{h.} \times \text{mole } (C_2H_4 + C_3H_6)}$$

By operating under the same conditions, but preparing the catalyst and carrying out the copolymerization at 25° C., instead of at −20° C., one obtains only 0.3 g. of an ethylene-propylene copolymer in 20 minutes, from which an average rate is determined $$10.5 \frac{\text{g. copolymer} \times \text{liter}}{\text{g. vanadium} \times \text{h.} \times \text{mole } (C_2H_4 + C_3H_6)}$$

*Example 4*

A 6 liter autoclave, provided with a stirrer and a jacket for the circulation of a cooling fluid, is charged with 4 liters of liquid propylene at −10° C., which is then saturated to equilibrium with ethylene under a total pressure of 5 abs. atm.

1.24 g. of vanadium trichloride tripyridinate (3.2 mols) and 4.64 g. of diethyl aluminum monochloride (38.5 mols) are then introduced.

The copolymerization is carried out at —10° C. for 1½ hours, while the pressure is maintained constant by a continuous feed of ethylene, in order to maintain the composition of the liquid phase constant at 97% by mol of propylene. When the reaction is completed, 495 g. of copolymer are obtained which is amorphous at the X-rays with a yield of 1000 g./g. of vanadium trichloride. The dried product has the following characteristics:

Viscosity Mooney ML (1+4) at 100° C. _____ 100
Temperature of minmum elastic rebound ° C____ —38

The copolymer was mixed with the following ingredients:

| | Parts/wt. per 100 parts of copolymer |
|---|---|
| Carbon Black HAF "Kosmos 60" | 50 |
| Dicumyl peroxide | 2 |
| Sulfur | 0.24 | and the mixture was vulcanized by heating it in a press at 165° C. for 30 minutes. The vulcanizate has the following characteristics:

Ultimate tensile stress, kg./cm.$^2$ _____ 241
Elongation at tensile breaking point, percent _____ 475
Elastic modulus at 300%, kg./cm.$^2$ _____ 113
Permanent set after breaking, percent _____ 6.5
Resistance to tearing, kg./cm.$^2$ _____ 42

*Example 5*

350 cc. of anhydrous n-heptane are introduced into the same reaction apparatus, thermostatically set at —20° C., which was described in Example 1. A gaseous mixture of propylene-ethylene in a molar ratio 4:1 is fed through the gas inlet line, and circulated at a rate of 200 Nl./h. The catalyst is pre-formed in a 100 cc. flask by reacting in 30 cc. of anhydrous toluene at —20° C. under nitrogen, 1 millimol of vanadium tetrachloride bipyridinate and 5 millimols of diethyl aluminum monochloride. The catalyst thus prepared is held at —20° C. for one minute and then siphoned into the reactor by means of nitrogen pressure.

Circulation of the ethylene-propylene mixture is continued at a rate of 400 Nl./h. After 10 minutes from the introduction of the catalyst, the reaction is stopped by adding methanol. The product is purified and recovered as described in Example 1.

After vacuum drying, 4 g. of a solid product, amorphous at the X-rays, completely soluble in boiling n-heptane and having the appearance of an unvulcanized elastomer, are obtained.

The average copolymerization rate corresponds to $$222 \frac{\text{g. copolymer} \times \text{liter}}{\text{g. vanadium} \times \text{h.} \times \text{mols } (C_2H_4+C_3H_6)}$$

Operating under the same conditions, but preparing the catalyst and carrying out the polymerization at 25° C., instead of at —20° C., there is obtained only 1 g. of an ethylene-propylene copolymer in 20 minutes, which corresponds to an average rate of $$98 \frac{\text{g. copolymer} \times \text{liter}}{\text{g. vanadium} \times \text{h.} \times \text{mols } (C_2H_4+C_3H_6)}$$

*Example 6*

350 cc. of anhydrous n-heptane are introduced into the reaction apparatus as described in Example 1, thermostatically set at —20° C. A gaseous mixture of propylene-ethylene in a molar ratio of 4:1 is fed through the gas inlet line, and circulated at a rate of 200 Nl./h. The catalyst is pre-formed in a 100 cc. flask by reacting in 30 cc. of anhydrous toluene at —20° C. under nitrogen, 1 millimol of the complex VCl$_3$-pyridine oxide and 5 milli- mols of diethyl aluminum monochloride. The catalyst is held at —20° C. for one minute and then siphoned into the reactor by means of nitrogen pressure. Feed and discharge of the ethylene-propylene mixture are continued at a rate of 400 Nl./h.

After 8 minutes from the start, the reaction is stopped by adding methanol. The product is purified and recovered as described in Example 1.

After vacuum drying 5 g. are obtained of a solid product, amorphous at the X-rays, completely soluble in boiling n-heptane, and having the appearance of an unvulcanized elastomer.

The copolymerization rate corresponds to $$277 \frac{\text{g. copolymer} \times \text{liter}}{\text{g. vanadium} \times \text{h.} \times \text{mols } (C_2H_4+C_3H_6)}$$

By operating under the same conditions, but preparing the catalyst and carrying out the polymerization at 25° C., instead of at —20° C., only 1.1 g. of an ethylene-propylene copolymer is obtained in 20 minutes, which corresponds to $$108 \frac{\text{g. copolymer} \times \text{liter}}{\text{g. vanadium} \times \text{h.} \times \text{mols } (C_2H_4+C_3H_6)}$$

What is claimed is:

1. The process for producing solid, linear, amorphous copolymerizates of ethylene and a higher alpha-olefin selected from the group consisting of propylene and butene-1 by copolymerizing a mixture of the monomers, in the liquid phase, in contact with a catalyst obtained by mixing (A) a dialkyl aluminum halide in which the alkyl groups each contain from 1 to 6 carbon atoms and (B) a coordination compound of a halogenated vanadium compound and a Lewis base selected from the group consisting of

| | |
|---|---|
| diethyl ether | trimethyl amine |
| dipropyl ether | diethyl methylamine |
| diisobutyl ether | pyridine oxide |
| diethoxy ethane | pyridine, and |
| tetrahydrofuran | quinoline |
| dioxane | | at a molar ratio of (A) to (B) in the range 2:1 to 30:1, and at a molar ratio of higher alpha-olefin to ethylene in the liquid phase of at least 4:1 when the higher alpha-olefin is propylene, and of at least 20:1 when the higher alpha-olefin is butene-1, which process is characterized in that both the preparation of the catalyst and the copolymerization are carried out at a temperature in the range 0° C. to —80° C., where there is obtained a yield of the amorphous copolymerizate per unit weight of catalyst used higher than is obtained when the catalyst is prepared and the copolymerization is carried out at temperatures above 0° C.

2. The process according to claim 1, further characterized in that both the preparation of the catalyst and the copolymerization are carried out at a temperature in the range of from —10° C. to —50° C.

3. The process according to claim 2, further characterized in that the mixed monomers are copolymerized in an inert solvent selected from the group consisting of aliphatic, aromatic and halogenated hydrocarbon solvents.

4. The process according to claim 2, further characterized in that the mixed monomers are copolymerized in the liquid phase in the absence of an extraneous solvent.

5. The process according to claim 2, further characterized in that the comonomers are ethylene and liquid propylene.

6. The process according to claim 2, further characterized in that the catalyst is obtained by mixing (A) diethyl aluminum monohalide and (B) vanadium trichloride tetrahydrofuranate.

7. The process according to claim 2, further characterized in that the catalyst is obtained by mixing (A)

diethyl aluminum monohalide with (B) vanadium trichloride pyridinate.

8. The process according to claim 2, further characterized in that the catalyst is obtained by mixing (A) diethyl aluminum monohalide with (B) a complex formed of vanadium trichloride and symmetrical diethoxyethane.

9. The process according to claim 2, further characterized in that the catalyst is obtained by mixing (A) diethyl aluminum monohalide and (B) vanadium tetrachloride bipyridinate.

10. The process according to claim 2, further characterized in that the catalyst is obtained by mixing (A) diethyl aluminum monohalide and (B) a complex of vanadium trichloride and pyridine oxide.

References Cited

UNITED STATES PATENTS

| | | | |
|---|---|---|---|
| 2,996,459 | 8/1961 | Andersen et al. | 260—88.2 |
| 3,116,274 | 12/1963 | Boehm et al. | 260—94.9 |
| 3,139,418 | 6/1964 | Marullo et al. | 260—93.7 |
| 3,205,216 | 9/1965 | McManimie | 260—94.9 |

FOREIGN PATENTS

| | | |
|---|---|---|
| 564,772 | 8/1958 | Belgium. |
| 851,113 | 10/1960 | Great Britain. |

JOSEPH L. SCHOFER, *Primary Examiner.*

M. B. KURTZMAN, *Assistant Examiner.*

UNITED STATES PATENT OFFICE
CERTIFICATE OF CORRECTION

Patent No. 3,369,011                               February 13, 1968

Alberto Valvassori et al.

It is hereby certified that error appears in the above numbered patent requiring correction and that the said Letters Patent should read as corrected below.

In the heading to the printed specification, line 6, for "Guido Sartoni" read -- Guido Sartori --.

Signed and sealed this 1st day of April 1969.

(SEAL)
Attest:

Edward M. Fletcher, Jr.                            EDWARD J. BRENNER
Attesting Officer                                     Commissioner of Patents